June 16, 1931.    F. B. PFEIFFER    1,810,677
FABRIC SLITTING MACHINE
Filed April 2, 1929
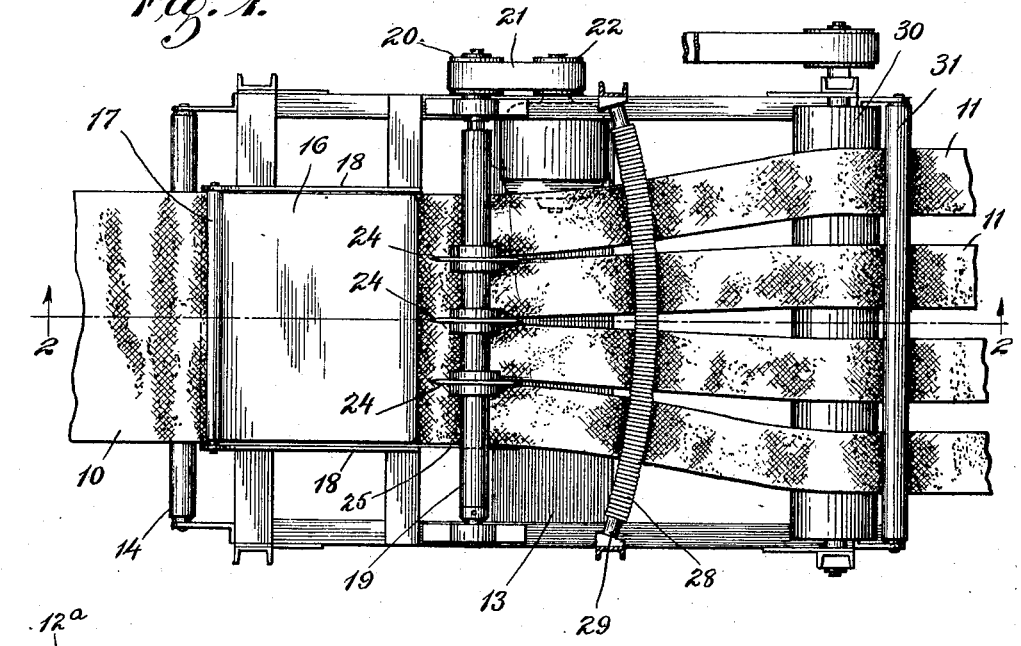
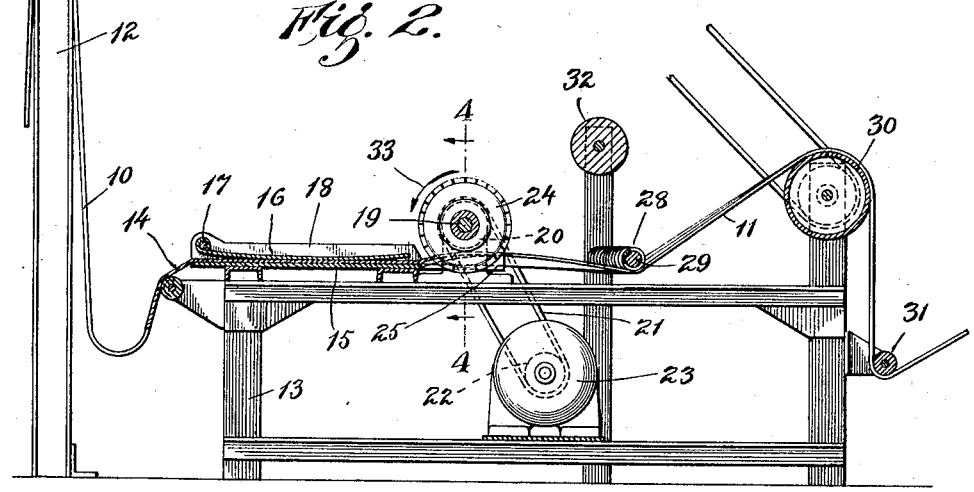
Inventor
Fred B. Pfeiffer
By Robert M. Pierson
Atty.

Patented June 16, 1931

1,810,677

UNITED STATES PATENT OFFICE

FRED B. PFEIFFER, OF AKRON, OHIO, ASSIGNOR TO SEIBERLING RUBBER COMPANY, OF BARBERTON, OHIO, A CORPORATION OF DELAWARE

FABRIC SLITTING MACHINE

Application filed April 2, 1929. Serial No. 351,912.

This invention relates to means for slitting fabric and other sheet material and particularly coated textile material which is readily distorted, such as rubberized bias woven fabric.

The principal object of my invention is to preserve an even width of the material while being slit at a relatively rapid rate, and to this end I prefer to employ a cutter of the rotary saw or disk-knife type and rotate this knife or cutter at high speed in the general direction of feed of the material, so that the cutting action may produce or assist in the feeding action and thus avoid having to draw the sheet against the knife, which would have a tendency to increase the length and decrease the width of the bias cut strips.

A further object is to feed the cut strips forward in spaced-apart relation, substantially as hereinafter described.

Of the accompanying drawings, Fig. 1 is a plan view showing a fabric-slitting apparatus constructed according to my invention.

Fig. 2 is a vertical, longitudinal section thereof on the line 2—2 of Fig. 1.

In the drawings, 10 indicates a strip of rubberized, bias, woven fabric of the necessary width to form the desired number, four in this instance, of narrower strips 11 adapted for uses such as in pneumatic tire manufacture to form the flippers and chafers in the beads of a tire casing. A number of lengths of this rubberized, bias fabric are pieced together at their ends to form the strip 10, and the latter is led through a suitable feeder such as a festooning rack 12 whose last roll 12ª is power-driven, and thence into and through the cutting machine.

The cutting apparatus includes a suitable frame 13 having at one end an idler guiding roller 14 for the entering strip, and just beyond this a fabric supporting and guiding device including a fixedly-mounted, lower, horizontal plate 15 and an upper plate 16 pivoted at 17 at its rear end between edge guides 18 at the side edges of the lower plate, the fabric strip passing between these plates and being lightly held down on the lower one by the weight of the upper plate so that it will be smoothly and accurately presented to the action of the cutter disks.

Mounted above the path of the fabric is a cutter shaft 19, supported in suitable end bearings, and adapted to be rapidly rotated in the direction of the arrow 33, by means of a pulley 20 connected by belt 21 with a pulley 22 on the shaft of an electric motor 23 mounted on the lower part of the frame. A series of toothed rotary slitting knives or cutter disks 24, three in number for making four strips 11, are fixed to the shaft 19 at the desired intervals, these disks having sharpened edges which might, if desired, be continuous instead of interrupted by notches as shown, their action on the fabric partaking of the nature of a sawing operation as distinguished from the shearing action or pinching action of other types of cutters which move at the same surface speed as the work and require the cooperation of a mating cutter or an anvil roller. For these circular sawing cutters other forms of rapid saws might be substituted, although with less convenience. The action if the rapidly-rotating toothed cutters is essentially that of small buzz-saws.

The forward margin of the lower guide-plate 15 is divided into a number of individual fabric guides 25 separated by slots for the reception of the cutter disks 24, whereby the material is supported on opposite sides of the cutters while being slit, and the cuts strips 11 are properly guided from the cutters.

Beyond the slitting point is located a suitable strip-spreading instrumentality which may take the form of a flexible, wire-coil roller 28 mounted to turn loosely on a fixed rod 29 supported on the frame at its ends and bowed in the direction of advance of the fabric, the arcuate form of the wire roller tending to separate the edges of the individual strips 11. Beyond this spreading device the cut strips pass over a power-driven roller 30 and under an idle roller 31 and may then be suitably received and subjected to desired further treatment, as by having gum strips applied to their margins by a rubber calender in the manner described in my copending application Serial No. 351,914, filed concurrently herewith. The spreading has an incidental useful effect in reducing the contact of the cut strips with the rapidly-rotating knives and thus helping to avoid undue friction and heating of the knives, and smearing thereof with the softened gum coating of the fabric.

Mounted between suitable frame standards above the spreading roller 28 is an idle roller 32 whereby strips of fabric may at times be carried through the apparatus without slitting for further treatment beyond.

In the operation of this apparatus, the surface speeds of the power-driven rollers 12$^a$ and 30 are properly synchronized to propel the fabric without substantial stretching tension past the cutting point, and the cutter disks 24 are rotated in the direction of the arrow 33 in Fig. 2, so that their lower peripheries will be traveling in the same general direction as the feed of the fabric and at a much higher rate than it travels, and their slight propulsive force will be exerted on the fabric in a direction coinciding with its feed rather than counter thereto. This cutting of the fabric by a buzz-saw action in the general direction of its feed and without substantial longitudinal tension practically eliminates any stretching and narrowing of the bias fabric and enables me to slit such fabric at a relatively rapid rate and deliver it in proper condition for further treatment and for ultimate incorporation in manufactured articles such as pneumatic tires. This result is of high value to the tire manufacturer in reducing production cost and preserving the desired width of material such as bead flippers and chafing strips. It is found that rubberized fabric is peculiarly susceptible to being severed in this manner, apparently because the coating binds adjacent threads together, and makes them easier to cut through and less liable to pull out than with plain fabric, although the fabric is unconfined from above and not tightly held at the cutting point.

It will be understood that various changes may be made in the described embodiment and carrying out of my invention without departing from its scope as defined in the claim.

I claim:

In a fabric-slitting machine, the combination of fabric-guiding means having a cutting slot, means for drawing the fabric without substantial tension over said slot, a rotary cutter having an interrupted cutting periphery disposed above said fabric guiding means and projecting into said slot, and means for rapidly rotating said cutter in a direction that the active portion moves in the direction of the fabric feed.

In witness whereof I have hereunto set my hand this 30th day of March, 1929.

FRED B. PFEIFFER.